US010939046B2

(12) United States Patent
Magnani et al.

(10) Patent No.: US 10,939,046 B2
(45) Date of Patent: Mar. 2, 2021

(54) LED FLICKER MITIGATION FOR MOTION PICTURES

(71) Applicants: BAE Systems Imaging Solutions Inc., San Jose, CA (US); BAE Systems Imaging Solutions Inc., San Jose, CA (US); BAE Systems Imaging Solutions Inc., San Jose, CA (US)

(72) Inventors: Alberto M. Magnani, Danville, CA (US); Christopher R. Adams, Saratoga, CA (US); Calvin B. Ward, Castro Valley, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 62 days.

(21) Appl. No.: 15/828,010

(22) Filed: Nov. 30, 2017

(65) Prior Publication Data
US 2019/0166291 A1   May 30, 2019

(51) Int. Cl.
| | |
|---|---|
| *H04N 5/355* | (2011.01) |
| *H04N 5/235* | (2006.01) |
| *H04N 9/68* | (2006.01) |
| *G06T 5/00* | (2006.01) |
| *H04N 5/353* | (2011.01) |

(Continued)

(52) U.S. Cl.
CPC ............ *H04N 5/235* (2013.01); *G06T 5/007* (2013.01); *H04N 5/353* (2013.01); *H04N 5/355* (2013.01); *H04N 5/3594* (2013.01); *H04N 5/3658* (2013.01); *H04N 9/68* (2013.01)

(58) Field of Classification Search
CPC ..... H01L 27/146–14893; H01L 27/307; H01L 27/14643–14663; H04N 5/335–378; H04N 5/2353; H04N 5/2354; H04N 5/2357; H04N 5/3658; H04N 5/3594; H04N 5/359; H04N 5/374–37457
See application file for complete search history.

(56) References Cited

U.S. PATENT DOCUMENTS

| | | | |
|---|---|---|---|
| 2005/0001143 A1* | 1/2005 | Rhodes | H04N 5/3535 |
| | | | 250/208.1 |
| 2014/0152793 A1* | 6/2014 | Staker | G02B 21/361 |
| | | | 348/79 |

(Continued)

OTHER PUBLICATIONS

International Search Report dated Jan. 15, 2019, PCT/US2018/062818.

*Primary Examiner* — Mekonnen D Dagnew
(74) *Attorney, Agent, or Firm* — Calvin B. Ward (57) ABSTRACT

An apparatus for taking moving pictures, a method for taking moving pictures, and a novel pixel sensor array are disclosed. The apparatus includes a rectangular imaging array, a plurality of column processing circuits, and a controller. The rectangular imaging array is characterized by a plurality of rows and columns of UHDR pixel sensors and a plurality of readout lines, and a plurality of row select lines. Each column processing circuit is connected to a corresponding one of the plurality of readout lines. The controller causes the rectangular imaging array to measure a plurality of images of a scene that is illuminated by a pulsating light source characterized by an illumination period and a dark period. Each of the images is generated in a frame period which includes an exposure period and a dead period, the dead period being less than the dark period.

17 Claims, 4 Drawing Sheets

(51) Int. Cl.
*H04N 5/365* (2011.01)
*H04N 5/359* (2011.01)

(56) References Cited

U.S. PATENT DOCUMENTS

| | | | |
|---|---|---|---|
| 2015/0122974 A1* | 5/2015 | Fowler | H01L 27/14656 250/208.1 |
| 2015/0178535 A1* | 6/2015 | Bremer | G06K 7/10752 235/455 |
| 2017/0244921 A1* | 8/2017 | Velichko | H01L 27/14627 |
| 2018/0041681 A1* | 2/2018 | Pope | H05B 45/46 |

\* cited by examiner

LED FLICKER MITIGATION FOR MOTION PICTURES

BACKGROUND OF THE INVENTION

The power efficiency, high brightness, and long lifetime have made LEDs the lighting source of choice in many applications including street lighting, stoplights, car headlights, car brake lights, road signage, store signage, etc. The typical method for setting the light intensity from the LEDs is to drive the LEDs with a constant current and modulate the fraction of the time during which the LED is on. This is referred to as a Pulse Width Modulation (PWM) driver scheme. This scheme allows the LED to operate at the optimal driving current and deliver the desired brightness with low power consumption. The pulsing also helps keep the operating temperature low and extends the LED life. Each manufacturer and each application tends to arrive at a different optimal frequency and duty cycle.

While the pulsating nature of the illumination is not a problem for the human eye, which cannot detect pulses at the frequencies used to control the LEDs, the pulses present challenges when taking a picture of a scene, or a video with a typical digital sensor when the scene is illuminated by one or more LEDs being driven using PWM. The LEDs operate over a wide range of frequencies, and duty cycles. Further, when multiple LEDs are operating, the light sources are typically out of sync with one another. Hence, when taking a picture of a scene, or a video with a typical digital sensor or even a digital sensor with High Dynamic Range (HDR), there is a distinct probability that a particular frame capture either misses a pulse or set of pulses entirely, or saturates and blooms into neighboring pixels, destroying information. In a single photo snapshot, the picture can be simply wrong or not representative of the scene. In a video stream, one can obtain random blinking of steady light sources, missing parts of LED signage rendering the sign unreadable, or improper interpretation of signals which are actually blinking.

When taking a digital image of a scene with LEDs operated in such a manner, an HDR exposure is typically needed to capture the various shadows, mid-tones, and highlights (and extremely bright output of the LEDs). This HDR image typically translates to a very short exposure within a larger frame period to not saturate and bloom in the LED portion of the picture. This results in a flickering of the LED where from frame to frame, the "on" time of the LED source is either caught or missed by the short exposure. This flickering presents significant problems in systems such as self-driving automobile systems when operating at night, as missed frames mean that the system is blind for the period of the frame.

SUMMARY

The present invention includes an apparatus for taking moving pictures, a method for taking moving pictures, and a novel pixel sensor array. An apparatus according to the present invention includes a rectangular imaging array, a plurality of column processing circuits, and a controller. The rectangular imaging array is characterized by a plurality of rows and columns of ultra-high dynamic range (UHDR) pixel sensors and a plurality of readout lines, and a plurality of row select lines. Each column processing circuit is connected to a corresponding one of the plurality of readout lines. The controller causes the rectangular imaging array to measure a plurality of images of a scene that is illuminated by a pulsating light source characterized by an illumination period and a dark period. Each of the images generated in a frame period includes an exposure period and a dead period, the dead period being less than the dark period.

In one aspect of the invention, the exposure period is not synchronized with the illumination period.

In another aspect of the invention, the controller causes the rectangular imaging array to be readout in a rolling shutter mode.

In another aspect of the invention, the UHDR pixels comprise a floating diffusion node, a main photodiode, and a parasitic photodiode associated with the floating diffusion node.

In another aspect of the invention, the controller causes the rectangular array to be readout in a global shutter mode.

In another aspect of the invention, the UHDR pixels comprise a photodiode and a capacitor that captures charges overflowing from the photodiode when the photodiode saturates.

In another aspect of the invention, the UHDR pixel includes a photodiode, a floating diffusion node, a buffer connected to the floating diffusion node that produces a pixel output signal having a voltage that is a monotonic function of a voltage on the floating diffusion node, a bit line gate that connects the pixel output signal to the bit line in response to a row select signal, a first reset gate that connects the floating diffusion node to a first reset voltage source in response to a reset signal, a first transfer gate that connects the photodiode to the floating diffusion node in response to a first transfer signal, an overflow capacitor connected to the floating diffusion node via a second transfer gate that connects the overflow capacitor to the floating diffusion node in response to a second transfer signal; and an overflow transfer gate that connects the photodiode to the overflow capacitor in response to an overflow transfer gate signal. In another aspect of the invention, each UHDR pixel further includes a second reset gate that connects the photodiode and the overflow capacitor to a reset voltage without applying the reset voltage to the floating diffusion node.

The present invention also includes a method for operating a camera having a rectangular imaging array characterized by a plurality of rows and columns of UHDR pixel sensors and a controller that causes the rectangular imaging array to measure a plurality of images of a scene illuminated by a pulsating light source characterized by an illumination period and a dark period. The method includes generating each of the images in a frame period which includes an exposure period and a dead period, the dead period is less than the dark period.

In another aspect of the invention, the exposure period is not synchronized with the illumination period.

In another aspect of the invention, the UHDR pixel sensors have sufficient dynamic range to capture the images if the exposure period includes a plurality of illumination pulses or the exposure period is equal to the illumination period minus the dark period.

In another aspect of the invention, the rectangular array is readout in a global shutter mode.

In another aspect of the invention, the rectangular array is readout in a rolling shutter mode.

The present invention also includes an imaging array having a plurality of pixel sensors connected to a bit line, each pixel sensor includes a photodetector that includes a photodiode, a floating diffusion node, and a buffer connected to the floating diffusion node that produces a pixel output signal having a voltage that is a monotonic function of a voltage on the floating diffusion node. The photodetector also includes a bit line gate that connects the pixel output signal to the bit line in response to a row select signal, and a first reset gate that connects the floating diffusion node to a first reset voltage source in response to a first reset signal. The photodetector also includes a first transfer gate that connects the photodiode to the floating diffusion node in response to a first transfer signal, an overflow capacitor connected to the floating diffusion node via a second transfer gate that connects the overflow capacitor to the floating diffusion node in response to a second transfer signal, an overflow transfer gate that connects the photodiode to the overflow capacitor in response to an overflow transfer gate signal, and a second reset gate that connects the overflow capacitor and overflow transfer gate to the first reset voltage source in response to a second reset signal applied to the second reset gate and the overflow transfer gate.

In another aspect of the invention, the overflow transfer gate signal is adjusted to a level that causes charge to flow to the overflow capacitor rather than the floating diffusion node when a charge generated by the photodiode exceeds an overflow threshold value.

In another aspect of the invention, the buffer includes a source follower having a gate connected to the floating diffusion node.

In another aspect of the invention, a controller generates the first and second sampling signals, the reset signal, the first and second transfer signals, and the overflow transfer gate signal.

In another aspect of the invention, the controller causes the photodiode and the overflow capacitor in each of the pixel sensors to be reset to a reset voltage without connecting the photodiode or the overflow capacitor to the floating diffusion node. In another aspect of the invention, the controller isolates the photodiode from the floating diffusion node in each of the pixel sensors such that a photocharge generated by light striking the photodiode is first accumulated on the photodiode until the photodiode reaches a predetermined level of stored photocharge, any excess photocharge beyond this predetermined level is stored on the overflow capacitor.

DETAILED DESCRIPTION

To simplify the following discussion, a pixel sensor is defined to be a circuit that converts light incident thereon to an electrical signal having a magnitude that is determined by the amount of light that was incident on that circuit in a period of time, referred to as the exposure. The pixel sensor has a gate that couples that electrical signal to a readout line in response to a signal on a row select line.

A rectangular imaging array is defined to be a plurality of pixel sensors organized as a plurality of rows and columns of pixel sensors. The rectangular array includes a plurality of readout lines and a plurality of row select lines, each pixel sensor being connected to one row select line and one readout line, the electrical signal generated by that pixel being connected to the readout line associated with that pixel in response to a signal on the row select line associated with that pixel sensor.

Figure 1:
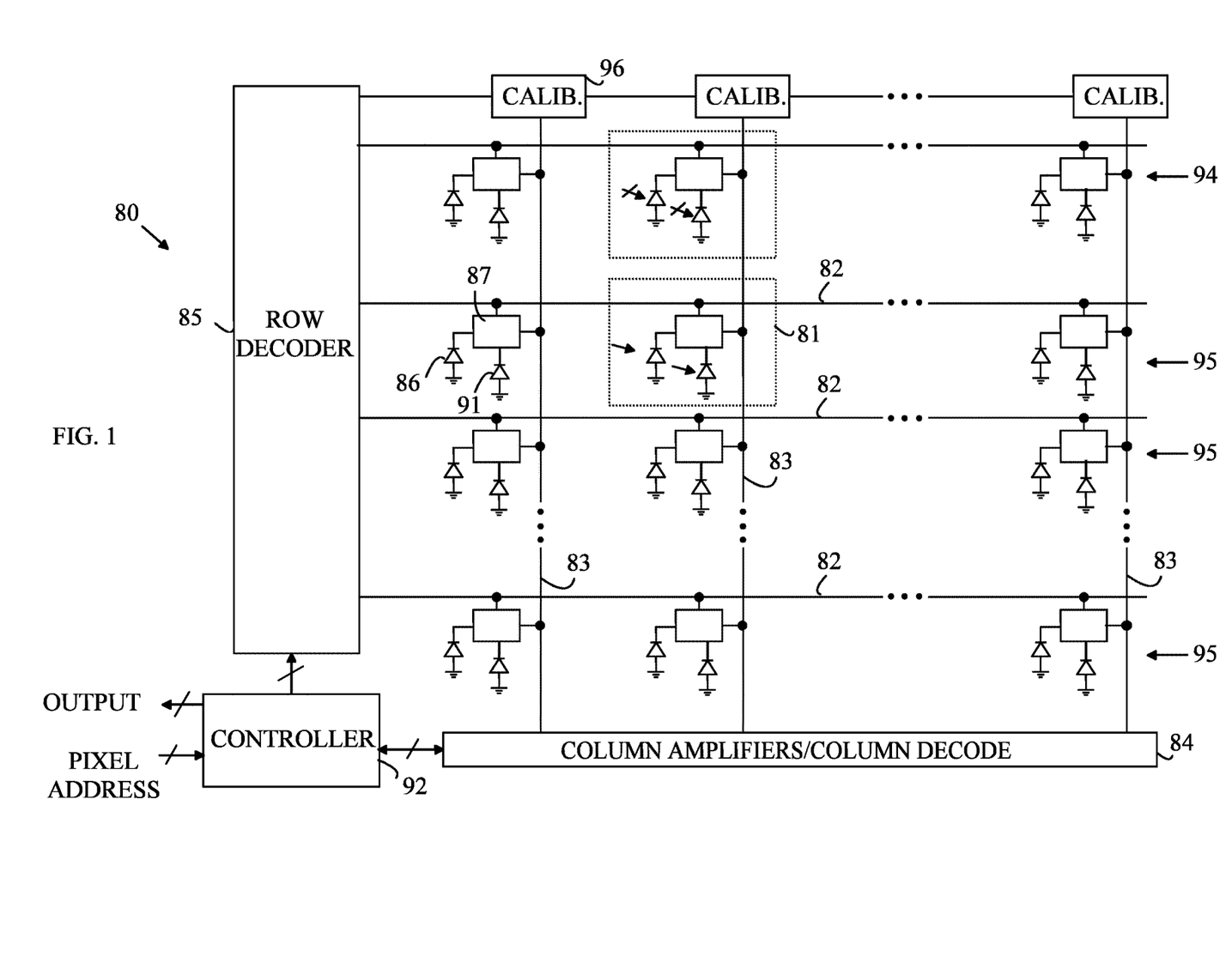
FIG. 1 illustrates a two-dimensional imaging array according to one embodiment of the present invention.

The manner in which the present invention provides its advantages can be more easily understood with reference to FIG. 1, which illustrates a two-dimensional imaging array according to one embodiment of the present invention. Rectangular imaging array 80 includes sensors such as pixel sensor 81. Each pixel sensor has a main photodiode 86 and a parasitic photodiode 91. The manner in which the pixel sensor operates will be discussed in more detail below. The reset circuitry and amplification circuitry in each pixel is shown at 87. The pixel sensors are arranged as a plurality of rows and columns. Exemplary rows are shown at 94 and 95. Each pixel sensor in a column is connected to a readout line 83 that is shared by all of the pixel sensors in that column. Each pixel sensor in a row is connected to a row select line 82 which determines if the pixel sensor in that row is connected to the corresponding readout line.

The operation of rectangular imaging array 80 is controlled by a controller 92 that receives a pixel address to be readout. Controller 92 generates a row select address that is used by row decoder 85 to enable the readout of the pixel sensors on a corresponding row in rectangular imaging array 80. The column amplifiers are included in an array of column amplifiers 84 which execute the readout algorithm, which will be discussed in more detail below. A set of calibration sources 96 allow differences in the column amplifiers to be measured and corrected. All of the pixel sensors in a given row are readout in parallel; hence there is one column amplification and analog-to-digital converter (ADC) circuit per readout line 83. The column processing circuitry will be discussed in more detail below.

When rectangular imaging array 80 is reset and then exposed to light during an imaging exposure, each photodiode accumulates a charge that depends on the light exposure and the light conversion efficiency of that photodiode. That charge is converted to a voltage by reset and amplification circuitry 87 in that pixel sensor when the row in which the pixel sensor associated with that photodiode is readout. That voltage is coupled to the corresponding readout line 83 and processed by the amplification and ADC circuitry associated with the readout line in question to generate a digital value that represents the amount of light that was incident on the pixel sensor during the imaging exposure.

A motion picture is a sequence of frames, each frame comprising a readout of the entire rectangular array of pixel sensors. There is a time period in each frame in which light is not measured by the imaging array. This time will be referred to as the dead time of the array. The maximum exposure for an array is determined by the frame rate and the dead time.

There are two types of readout schemes, referred to as global shutter and rolling shutter. In a global shutter scheme, all rows of the array are reset simultaneously, exposed to light from the image. After a predetermined exposure time, the accumulated photocharge is transferred to the floating diffusion node in each pixel sensor, the transferred charge is measured one row at a time.

In a rolling shutter camera, each row is processed sequentially in the array. The processing starts by transferring the photocharge to the floating diffusion node, which ends the current exposure for that row. The charge is then readout and the photodiode(s) are reset after a predetermined time determined by the desired exposure time and allowed to accumulate photocharge for the next frame.

In the prior art, both of these schemes have a common exposure time for each row of pixels, and that exposure is less than the maximum exposure time allowed for the chosen frame rate. The time between the maximum possible exposure and the actual exposure time will be referred to as the dead time in the following discussion. In a flashing illumination application, any illumination pulse that occurs during this dead time is either lost or only partially effective in illuminating the scene of interest. If the camera is not synchronized with the illumination source, the scene will exhibit flickering. Furthermore, some of the frames can be lost altogether, if the pulse for that frame occurred entirely within the dead time. In an autonomous driving vehicle, such lost frames can result in the computer being blinded, which poses significant safety issues for self-driving vehicles.

The present invention is based on the observation that lost frames can be avoided by using an exposure scheme in which the shutter is effectively open during essentially all of the exposure, except for the small period of time in which the charge is being transferred to the floating diffusion node to be measured. Even in the case in which the readout time is significant, the next frame will have been started and the photodiodes will be accumulating light, and hence, no pulse will be missed.

The challenge with this type of scheme lies in the potential for over-exposure. If the scene is being illuminated by multiple pulsing non-synchronized light sources, multiple pulses can be captured in the same exposure leading to blooming in the image at bright locations. The present invention overcomes this problem by using an UHDR pixel design that has sufficient dynamic range to capture the light received by each pixel even if a conventional pixel would saturate during the excessive exposure. For the purposes of the present discussion, an UHDR pixel sensor is defined to be a pixel sensor having one or more photodiodes for measuring light received by the pixel sensor during an exposure. The range of exposures that can be measured by an UHDR pixel sensor is greater than the range of exposures that can be measured by one of the photodiodes in the sensor without causing that photodiode to saturate.

The dynamic range of the pixel is the ratio of the largest light exposure the pixel can measure without saturating divided by the smallest light exposure that the pixel can measure over the noise. In a non-UHDR pixel, the photodiode will saturate at the highest exposure and any remaining light exposure is lost. In a multi-photodiode UHDR pixel, when the photodiode saturates, a second photodiode having a lower light to photocharge conversion ratio is used to measure the light or the photocharge that overflows from the first photodiode is captured on a capacitor and added to the photocharge on the saturated photodiode. In a single photodiode UHDR pixel, the charge that overflows is captured on a capacitor and added to the charge remaining in the photodiode at the readout of the UHDR pixel.

The challenge in using an UHDR pixel array lies in providing the capacitor or the second photodiode within a conventional fabrication process without substantially changing the area of the pixel array. Consider embodiments in which a conventional second photodiode is added to each pixel. The preferred ratio of photo-conversion ratios is about 30:1. Hence, the second photodiode would need to have an area that is $\frac{1}{30}^{th}$ that of the conventional photodiode. Making such a small photodiode presents significant challenges in current fabrication processes. If the light conversion efficiency per unit area of the second photodiode is reduced to increase its area to accommodate the fabrication limitations, then the area of the pixel will be increased significantly leading to additional costs.

Similarly, the addition of a capacitor for each pixel on which the overflow charge is stored requires a second transfer gate connecting the photodiode to the floating diffusion node and space for the capacitor. Again there is an increase in area, and the associated costs.

Figure 2:
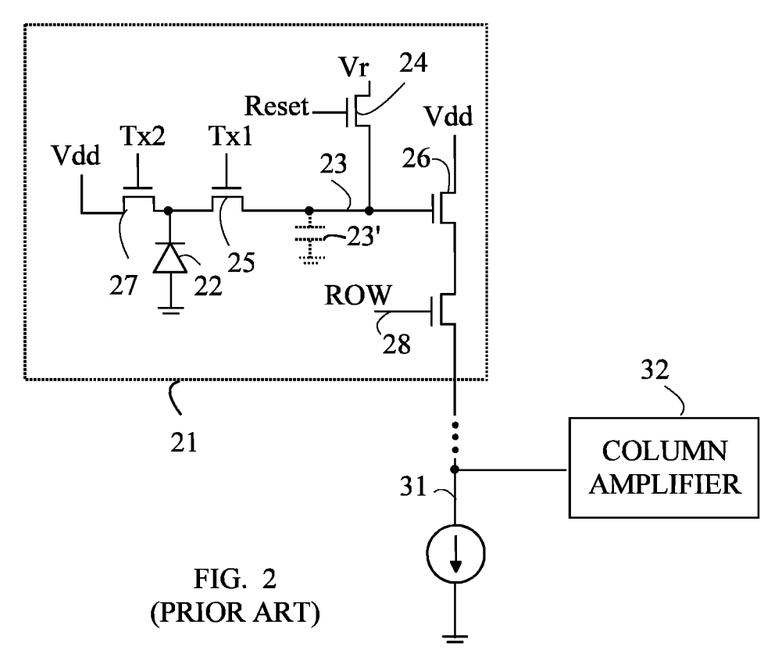
FIG. 2 is a schematic drawing of a typical prior art pixel sensor in one column of pixel sensors in an imaging array.

The preferred embodiment of an UHDR for use in the present invention utilizes a parasitic diode that is associated with a floating diffusion node in each pixel to provide the second photodiode. The manner in which this UHDR achieves its advantages can be more easily understood with reference to FIG. 2. FIG. 2 is a schematic drawing of a typical prior art pixel sensor in one column of pixel sensors in an imaging array. Pixel sensor 21 includes a photodiode 22 that measures the light intensity at a corresponding pixel in the image. Initially, photodiode 22 is reset by placing gate 25 in a conducting state and connecting floating diffusion node 23 to a reset voltage, $V_r$. Gate 25 is then closed and photodiode 22 is allowed to accumulate photoelectrons. A potential on gate 27 sets the maximum amount of charge that can be accumulated on photodiode 22. If more charge is accumulated than allowed by the potential on gate 27, the excess charge is shunted to the power rail through gate 27 to avoid blooming.

After photodiode 22 has been exposed, the charge accumulated in photodiode 22 is typically measured by noting the change in voltage on floating diffusion node 23 when the accumulated charge from photodiode 22 is transferred to floating diffusion node 23. Floating diffusion node 23 is characterized by a capacitance represented by capacitor 23'. In practice, capacitor 23' is charged to a voltage $V_r$ and isolated by pulsing the reset line of gate 24 prior to floating diffusion node 23 being connected to photodiode 22. The charge accumulated on photodiode 22 is transferred to floating diffusion node 23 when gate 25 is opened. The voltage on floating diffusion node 23 is sufficient to remove all of this charge, leaving the voltage on floating diffusion node 23 reduced by an amount that depends on the amount of charge transferred and the capacitance of capacitor 23'. Hence, by measuring the change in voltage on floating diffusion node 23 after gate 25 is opened, the accumulated charge can be determined.

If the reset voltage on floating diffusion node 23 is sufficiently reproducible, then a single measurement of the voltage on floating diffusion node after reset is sufficient. However, noise results in small variations in the reset voltage. If this noise is significant, a correlated double sampling algorithm is utilized. In this algorithm, floating diffusion node 23 is first reset to $V_r$ using reset gate 24. The potential on floating diffusion node 23 is then measured by connecting source follower 26 to readout line 31 by applying a select signal to line 28 to a readout gate. This reset potential is stored in column amplifier 32. Next, gate 25 is placed in a conducting state and the charge accumulated in photodiode 22 is transferred to floating diffusion node 23. It should be noted that floating diffusion node 23 is effectively a capacitor that has been charged to $V_r$. Hence, the charge leaving photodiode 22 lowers the voltage on floating diffusion node 23 by an amount that depends on the capacitance of floating diffusion node 23 and the amount of charge that is transferred. The voltage on floating diffusion node 23 is again measured after the transfer. The difference in voltage is then used to compute the amount of charge that accumulated during the exposure.

The present invention is based on the observation that a pixel of the type discussed above can be modified to include a second parasitic photodiode that is part of the floating diffusion node and has a significant photodiode detection efficiency. This second light detector does not significantly increase the size of the pixel, and hence, the present invention provides the advantages of a two-photodiode pixel without significantly increasing the pixel size.

Figure 3:
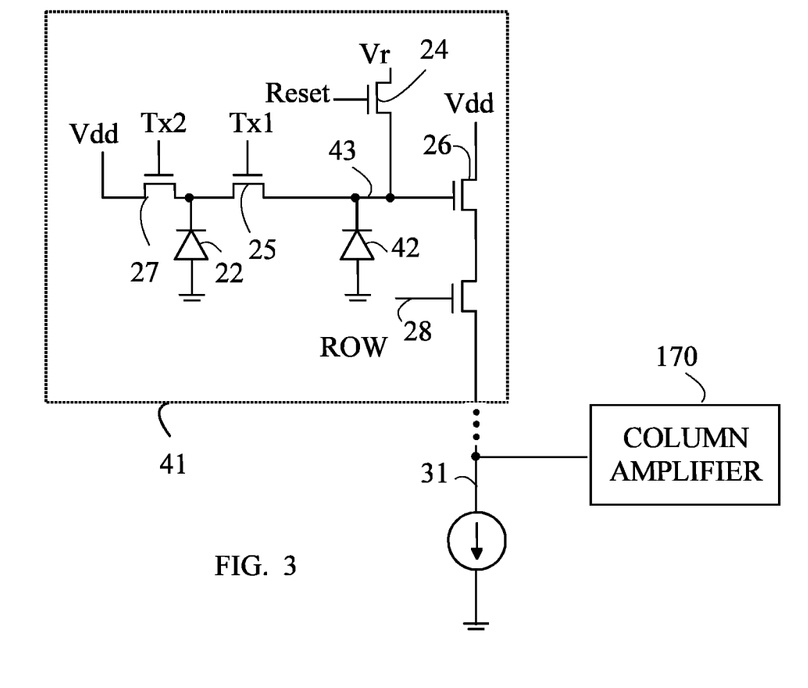
FIG. 3 illustrates a pixel sensor in which the parasitic photodiode is utilized in an image measurement.

To distinguish the parasitic photodiode from photodiode 22, photodiode 22 and photodiodes serving analogous functions will be referred to as the "conventional photodiode". Refer now to FIG. 3, which illustrates a pixel sensor in which the parasitic photodiode is utilized in an image measurement. To simplify the following discussion, those elements of pixel sensor 41 that serve functions analogous to those discussed above with respect to FIG. 1 have been given the same numeric designations and will not be discussed further unless such discussion is necessary to illustrate a new manner in which those elements are utilized. In general, parasitic photodiode 42 has a detection efficiency that is significantly less than that of photodiode 22. The manner in which the ratio of the photodiode detection efficiencies of the two photodiodes is adjusted is discussed in more detail in co-pending U.S. patent application Ser. No. 14/591,873, filed on Jan. 7, 2015. In one exemplary embodiment, the ratio of the conversion efficiency of the main photodiode to the parasitic photodiode is 30:1. Other embodiments in which this ratio is 20:1 or 15:1 are useful.

The manner in which pixel sensor 41 is utilized to measure the intensity of a pixel in one embodiment of the present invention will now be explained in more detail. The process may be more easily understood starting from the resetting of the pixel after the last image readout operation has been completed. Initially, main photodiode 22 is reset to $V_r$ and gate 25 is closed. This also leaves floating diffusion node 43 reset to $V_r$. If a correlated double sampling measurement is to be made, this voltage is measured at the start of the exposure by connecting floating diffusion node 43 to column amplifier 170. Otherwise, a previous voltage measurement for the reset voltage is used. During the image exposure, parasitic photodiode 42 generates photoelectrons that are stored on floating diffusion node 43. These photoelectrons lower the potential on floating diffusion node 43. At the end of the exposure, the voltage on floating diffusion node 43 is measured by connecting the output of source follower 26 to column amplifier 170, and the amount of charge generated by parasitic photodiode 42 is determined to provide a first pixel intensity value. Next, floating diffusion node 43 is again reset to $V_r$ and the potential on floating diffusion node 43 is measured by connecting the output of source follower 26 to column amplifier 170. Gate 25 is then placed in the conducting state and the photoelectrons accumulated by main photodiode 22 are transferred to floating diffusion node 43. The voltage on floating diffusion node 43 is then measured again and used by column amplifier 170 to compute a second pixel intensity value.

If the light intensity on the corresponding pixel was high, main photodiode 22 will have overflowed; however, parasitic photodiode 42, which has a much lower conversion efficiency, will have a value that is within the desired range. On the other hand, if the light intensity was low, there will be insufficient photoelectrons accumulated on parasitic photodiode 42 to provide a reliable estimate, and the measurement from main photodiode 22 will be utilized.

The dead time associated with an array based on the pixel sensors shown in FIG. 3 in a rolling shutter system is the time needed to readout the pixel sensor. This time corresponds to the time to readout the parasitic photodiode and then the main photodiode in the manner described above.

Ideally, each pixel sensor is identical to every other pixel sensor, is reset to the same voltage during readout, and generates a signal value of zero when no light impinges on rectangular imaging array 80. In addition, under ideal conditions each column application circuit is identical to every other column amplification circuit. There are four analog conversion factors in the chain of processing from light exposure of a photodiode to a final digital value. These are the light-to-charge conversion efficiencies of the photodiodes. The charge-to-voltage conversion is in the pixel reset and amplification circuitry 87, and there is the voltage amplification circuitry in the column processing circuitry. Differences in these analog conversion factors give rise to fixed pattern noise (FPN). The FPN can depend on factors that change over time and also depend on the temperature of the imaging array when the exposure is taken.

In addition to FPN, there are other noise factors that must be reduced to obtain a noise factor that is small compared to the shot noise. Reset noise is an example of this type of noise. The manner in which reset noise is created can be more easily understood with reference to FIG. 2, which illustrates a prior art pixel sensor. FIG. 2 is a schematic drawing of a typical prior art pixel sensor in one column of pixel sensors in an imaging array. Pixel sensor 21 includes a photodiode 22 that measures the light intensity at a corresponding pixel in the image. Initially, photodiode 22 is reset by placing gate 25 in a conducting state and connecting floating diffusion node 23 to a reset voltage, $V_r$. Gate 25 is then closed and photodiode 22 is allowed to accumulate photoelectrons. A potential on gate 27 sets the maximum amount of charge that can be accumulated on photodiode 22. If more charge is accumulated than allowed by the potential on gate 27, the excess charge is shunted to the power rail through gate 27.

After photodiode 22 has been exposed, the charge accumulated in photodiode 22 is typically measured by noting the change in voltage on floating diffusion node 23 when the accumulated charge from photodiode 22 is transferred to floating diffusion node 23. Floating diffusion node 23 is characterized by a capacitance represented by capacitor 23'. In practice, capacitor 23' is charged to a voltage $V_r$ and isolated by pulsing the reset line of gate 24 prior to floating diffusion node 23 being connected to photodiode 22. The charge accumulated on photodiode 22 is transferred to floating diffusion node 23 when gate 25 is opened. The voltage on floating diffusion node 23 is sufficient to remove all of this charge, leaving the voltage on floating diffusion node 23 reduced by an amount that depends on the amount of charge transferred and the capacitance of capacitor 23'. Hence, by measuring the change in voltage on floating diffusion node 23 after gate 25 is opened, the accumulated charge can be determined.

If the reset voltage on floating diffusion node 23 is sufficiently reproducible, then a single measurement of the voltage on floating diffusion node after reset is sufficient. However, noise results in small variations in the reset voltage. If this noise is significant, a correlated double sampling algorithm is utilized. In this algorithm, floating diffusion node 23 is first reset to $V_r$ using reset gate 24. The potential on floating diffusion node 23 is then measured by connecting source follower 26 to readout line 31 by applying a select signal to line 28 to a readout gate. This reset potential is stored in column amplifier 32. Next, gate 25 is placed in a conducting state and the charge accumulated in photodiode 22 is transferred to floating diffusion node 23. It should be noted that floating diffusion node 23 is effectively a capacitor that has been charged to $V_r$. Hence, the charge leaving photodiode 22 lowers the voltage on floating diffusion node 23 by an amount that depends on the capacitance of floating diffusion node 23 and the amount of charge that is transferred. The voltage on floating diffusion node 23 is again measured after the transfer. The difference in voltage is then used to compute the amount of charge that accumulated during the exposure.

The present invention is based on the observation that a pixel of the type discussed above can be modified to include a second parasitic photodiode that is part of the floating diffusion node and has significant photodiode detection efficiency. This second light detector does not significantly increase the size of the pixel, and hence, the present invention provides the advantages of a two-photodiode pixel without significantly increasing the pixel size.

It should be noted that the photocharge for the main photodiode cannot be transferred to the floating diffusion node until after the parasitic photodiode photocharge has been measured. Once the parasitic photocharge is measured, the floating diffusion node is reset and the main photodiode photocharge is transferred to the floating diffusion node. At this point, the main photodiode could be reset through gate 27; however, the exposure cannot be started until the charge on the floating diffusion node has been readout and the floating diffusion node has been reset. Once the floating diffusion node has been reset and reset voltage measured, the exposure for the next frame can begin. Hence, the dead time is the total time needed to readout the pixel. Hence, as long as the dead time is less than the duration of one light pulse, the next light pulse will not have been missed. Accordingly, the present invention can provide a significant advantage in a rolling shutter system.

A global shutter imager using a two-photodiode pixel sensor has a significantly longer dead time, and hence, is not the preferred embodiment for such pixel sensors. In a global shutter arrangement, the entire array must be readout before the next frame exposure can start. Hence, the dead time is the time needed to readout the entire frame. If there are N lines in the array, the dead time will be N times the dead time in the rolling shutter embodiment. However, if the dead time is still significantly less than the light pulse duration, no frames will be completely lost.

Figure 4:
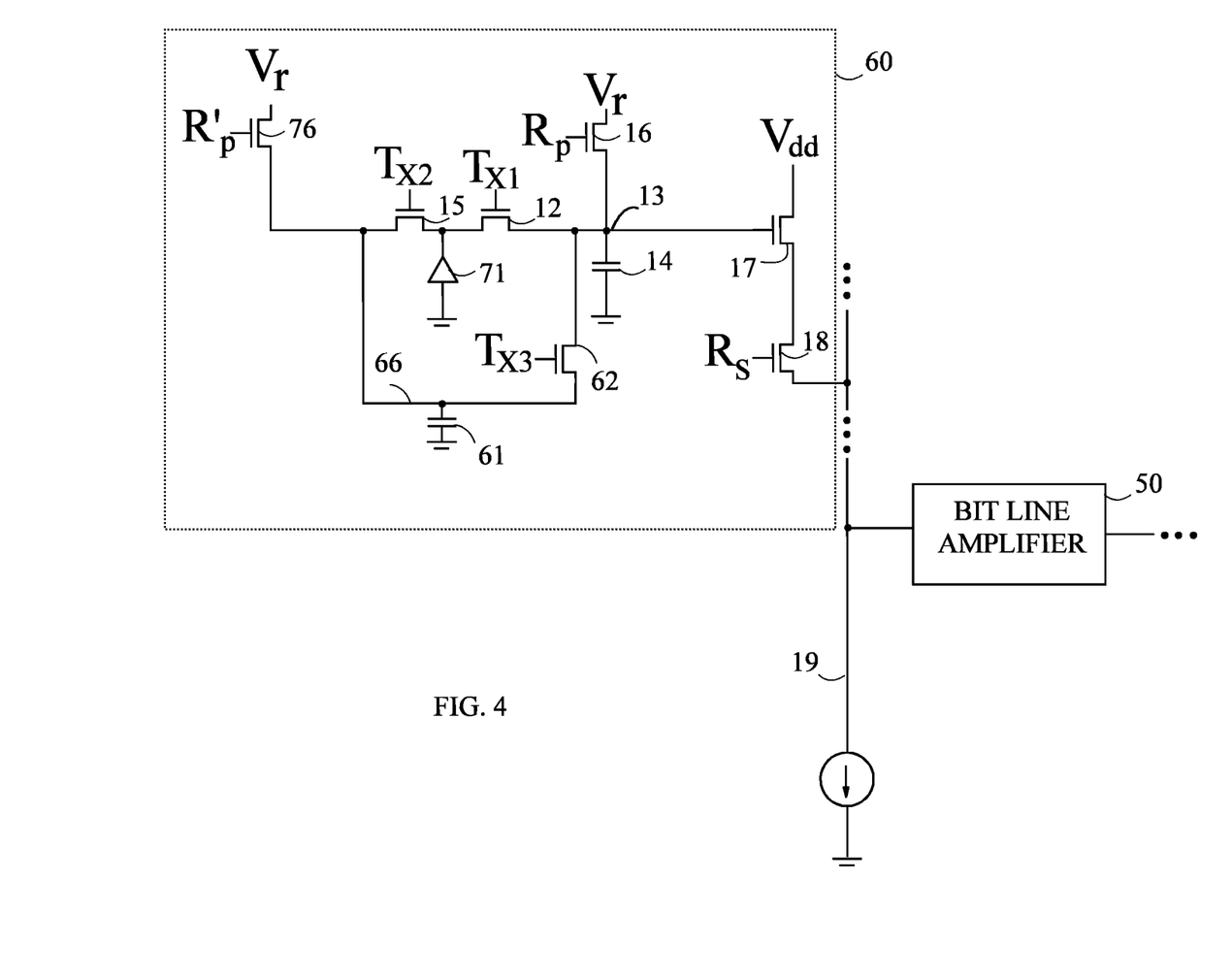
FIG. 4 illustrates an UHDR pixel according to another embodiment of the present invention.

While two photodiode UHDR pixel sensors are not optimal for a global shutter array with an extended exposure, other forms of UHDR pixels can be utilized in a global shutter array and still provide the advantage of a reduced dead time. Refer now to FIG. 4, which illustrates an UHDR pixel according to another embodiment of the present invention. Pixel 60 includes a photodiode 71 that generates the photocharge during an exposure. A transfer gate 12 allows the accumulated charge to be transferred from photodiode 71 to floating diffusion node 13 in response to signal $T_{x1}$. For the purposes of the present discussion, a floating diffusion node is defined to be an electrical node that is not tied to a power rail, or driven by another circuit. Floating diffusion node 13 is characterized by a parasitic capacitor 14 having a capacitance, C. Floating diffusion node 13 may also have a parasitic photodiode; however, the pixel sensors are shielded such that light does not reach the floating diffusion node in this embodiment. When gate 12 is in the conducting state, the photocharge collected on photodiode 71 alters the voltage of floating diffusion node 13 from a reset voltage value that is set prior to the transfer. The amount of reduction in the floating diffusion node voltage provides a measure of the photocharge that was transferred.

A reset gate 16 is used to set the voltage on floating diffusion node 13 prior to the charge being transferred. The voltage on floating diffusion node 13 is amplified by a source follower transistor 17. When pixel 60 is to be readout, a signal on gate transistor 18 connects the output of source follower transistor 17 to a bit line 19 that is shared by all of the pixel sensors in a given column. For the purposes of the present discussion, a bit line is defined to be a conductor that is shared by a plurality of columns of pixel sensors and carries a voltage signal indicative of the voltage at the floating diffusion node in a pixel sensor that is connected to the bit line through a transfer gate. Each bit line terminates in a column processing circuit that includes a bit-line amplifier 50.

Pixel 60 also includes an overflow capacitor 61 that collects the photocharge generated by photodiode 71 after photodiode 71 saturates. At the beginning of an exposure, photodiode 71 and overflow capacitor 61 are set to a reset voltage determined by $V_r$. As photocharge accumulates on photodiode 71, the voltage on photodiode 71 decreases until photodiode 71 reaches a value that is determined by the gate voltage on gate 15. Any additional photocharge flows through gate 15 and onto the combination of overflow capacitor 61, parasitic capacitor 14 (i.e., the parasitic capacitance of floating diffusion node 13), via overflow line 66 and the parasitic capacitances of gate 62, which remains in a conducting state throughout the exposure.

At the end of the exposure, the overflow charge will have been split between overflow capacitor 61 and parasitic capacitor 14. The voltage on the floating diffusion node will have decreased by an amount that depends on the overflow charge and the sum of the capacitances of capacitors 61 and 14. If either gates 12 or 15 are opened, the charge remaining on photodiode 71 will also be swept on parasitic capacitor 14 and reset gate 16, and hence, the voltage on floating diffusion node 13 will reflect the total photocharge generated during the exposure. If gates 12 and 62 are now placed in a non-conducting state, the voltage on floating diffusion node 13 will continue to represent all of the photocharge generated during the exposure.

It should be noted the charge transfer from photodiode 71 to floating diffusion node 13 can be carried out simultaneously on all pixels in the array. Furthermore, photodiode 71 and overflow capacitor 61 are isolated from floating diffusion node 13 and can be reset via gate 76. As soon as gate 76 goes non-conducting, a new exposure can start. During the new exposure, the voltages on the floating diffusion nodes can be readout one line at a time, and hence, the dead time is the time to transfer the charge from photodiode 71 to floating diffusion node 13, which is small compared to the duration of a light pulse that illuminates the scene.

As each pixel sensor is readout, the voltage on floating diffusion node 13 is reset to $V_r$ and measured for use in measuring the photocharge for the current exposure. Finally, gate 62 is placed in the conducting state, so that the overflow photocharge can be stored on the parallel connected capacitors.

In the above-described embodiments, the voltage on the floating diffusion node is readout using a source follower buffer. However, other forms of buffers could be utilized for this purpose including capacitive trans-impedance amplifiers.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
an imaging array characterized by a plurality of UHDR pixel sensors; and
a controller that causes said imaging array to measure a plurality of images of a scene being illuminated by a pulsating light source having a pulse period that is divided into an illumination period when said pulsating light source is illuminating said scene and a dark period when said scene is not being illuminated, each of said plurality of images being generated in a frame period comprising an exposure period during which said pixel sensors accumulate photocharge from said scene, and a dead time equal to said frame period minus said exposure period, said dead time being less than said illumination period, wherein said pulsating light source is not controlled by said controller and said exposure periods are not determined by said illumination periods.

2. The apparatus of claim 1 wherein said imaging array comprises a plurality of rows and columns of said UHDR pixel sensors, and wherein said controller causes said imaging array to be readout in a rolling shutter mode.

3. The apparatus of claim 1 wherein each of said UHDR pixel sensors comprises a floating diffusion node that is illuminated with light from said scene and which converts that light to a photocharge and a main photodiode.

4. The apparatus of claim 1 wherein said controller causes said imaging array to be readout in a global shutter mode.

5. The apparatus of claim 1 wherein each of said UHDR pixel sensors comprises a photodiode and an overflow capacitor that captures charges overflowing from said photodiode when said photodiode saturates.

6. The apparatus of claim 5 wherein each of said UHDR pixel sensors comprises:
a floating diffusion node;
a buffer connected to said floating diffusion node that produces a pixel output signal having a voltage that is a monotonic function of a voltage on said floating diffusion node;
a bit line gate that connects said pixel output signal to a bit line in response to a row select signal;
a first reset gate that connects said floating diffusion node to a first reset voltage source in response to a reset signal;
a first transfer gate that connects said photodiode to said floating diffusion node in response to a first transfer signal;
said overflow capacitor being connected to said floating diffusion node via a second transfer gate that connects said overflow capacitor to said floating diffusion node in response to a second transfer signal; and
an overflow transfer gate that connects said photodiode to said overflow capacitor in response to an overflow transfer gate signal.

7. The apparatus of claim 6 wherein each UHDR pixel further comprises a second reset gate that connects said photodiode and said overflow capacitor to a reset voltage without applying said reset voltage to said floating diffusion node.

8. A method for operating a camera having an imaging array characterized by a plurality of UHDR pixel sensors and a controller that causes said imaging array to measure a plurality of images of a scene being illuminated by a pulsating light source having a pulse period divided into an illumination period and a dark period, when said pulsating light source is illuminating said scene and a dark period when said scene is not being illuminated, each of said plurality of images being generated in a frame period comprising an exposure period during which said pixel sensors accumulate photocharge from said scene, and a dead time equal to said frame period minus said exposure period, said illumination period, wherein said pulsating light source is not controlled by said controller and said exposure periods are not determined by said illumination periods.

9. The method of claim 8 wherein said UHDR pixel sensors have sufficient dynamic range to capture each of said plurality of images if said exposure period includes a plurality of illumination pulses or said exposure period is equal to said illumination period minus said dark period.

10. The method of claim 8 wherein said imaging array is readout in a global shutter mode.

11. The method of claim 8 wherein said imaging array is readout in a rolling shutter mode.

12. An apparatus comprising a plurality of pixel sensors connected to a bit line, each pixel sensor comprising a photodetector comprising:
a photodiode;
a floating diffusion node;
a buffer connected to said floating diffusion node that produces a pixel output signal having a voltage that is a monotonic function of a voltage on said floating diffusion node;
a bit line gate that connects said pixel output signal to said bit line in response to a row select signal;
a first reset gate that connects said floating diffusion node to a first reset voltage source in response to a first reset signal;
a first transfer gate that connects said photodiode to said floating diffusion node in response to a first transfer signal;
an overflow capacitor connected to said floating diffusion node via a second transfer gate that connects said overflow capacitor to said floating diffusion node in response to a second transfer signal;
an overflow transfer gate that connects said photodiode to said overflow capacitor in response to an overflow transfer gate signal; and
a second reset gate that connects said overflow capacitor and overflow transfer gate to said first reset voltage source in response to a second reset signal being applied to said second reset gate and said overflow transfer gate.

13. The apparatus of claim 12 wherein said overflow transfer gate signal is adjusted to a level that causes charge to flow to said overflow capacitor rather than said floating diffusion node when a charge generated by said photodiode exceeds an overflow threshold value.

14. The apparatus of claim 12 wherein said buffer comprises a source follower having a gate connected to said floating diffusion node.

15. The apparatus of claim 12 further comprising a controller that generates said first and second sampling signals, said reset signal, said first and second transfer signals, and said overflow transfer gate signal.

16. The apparatus of claim 12 wherein said controller causes said photodiode and said overflow capacitor in each of said pixel sensors to be reset to a reset voltage without connecting said photodiode or said overflow capacitor to said floating diffusion node.

17. The apparatus of claim 16, wherein said controller isolates said photodiode from said floating diffusion node in each of said pixel sensors such that a photocharge generated by light striking said photodiode is first accumulated on said photodiode until said photodiode reaches a predetermined level of stored photocharge, any excess photocharge beyond this predetermined level being stored on said overflow capacitor.

* * * * *